Jan. 20, 1959      J. S. HARRIS      2,870,372
PULSE COMPARISON DISPLAY SYSTEM
Filed Oct. 1, 1953
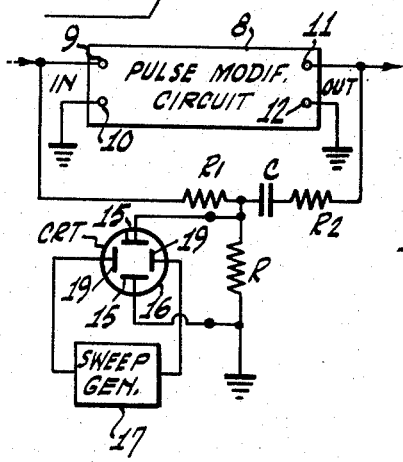
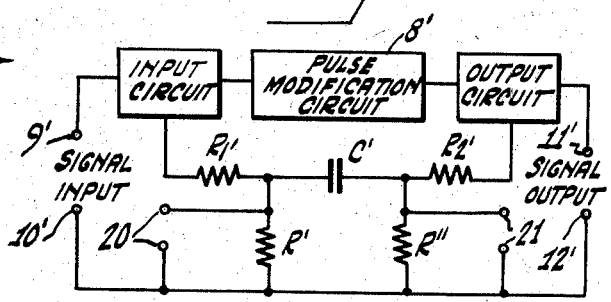
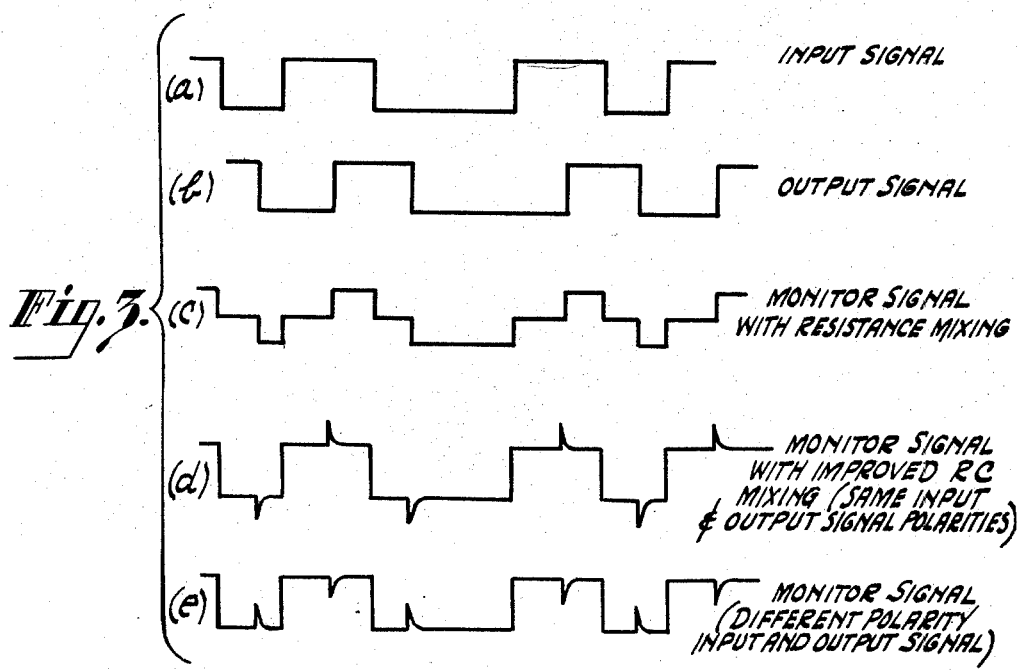
INVENTOR.
JAMES S. HARRIS
BY *Charles H. Brown*
ATTORNEY _United States Patent Office_

2,870,372
Patented Jan. 20, 1959

2,870,372

PULSE COMPARISON DISPLAY SYSTEM

James S. Harris, Old Greenwich, Conn., assignor to Radio Corporation of America, a corporation of Delaware Application October 1, 1953, Serial No. 383,570

10 Claims. (Cl. 315—26)

This invention relates to a pulse comparison display system, and particularly, to means for simultaneously displaying on a cathode ray tube a first pulse wave and a distinctive indication superimposed thereon of the characteristics of a second pulse wave. The composite display is such that the portions thereof due to the two pulse waves are readily distinguishable, and is such that the relative widths of the pulses in the two pulse waves, and the phase relationship between the two pulse waves, are clearly apparent to an observer.

While not limited thereto, the system of this invention is particularly useful in connection with equipment which repeats or modifies pulse waves. For example, in telegraphy, signal repeaters are used along the course of a long communications link to amplify and reform a received telegraph signal before sending it on to a receiver or to a distant point. Such a repeater is known as a regenerative repeater because it regenerates a new telegraph pulse wave which is free of the distortions in the received telegraph pulse wave caused by noise and the deteriorating effects of the communications link. Stated another way, the regenerative repeater "cleans up" the received telegraph pulse wave and reforms it to correspond exactly with the telegraph pulse wave as originally transmitted from the distant point.

In the operation of a telegraph system including regenerative repeaters, it is important for the operator to be able to observe the nature of the pulse wave applied to the repeater, and the nature of the pulse wave derived from the repeater. It is also important for the operator to be able to observe the phase relationship between the input pulse wave and the output pulse wave. In the past, the two pulse waves have been simultaneously observed by applying them respectively to the two input terminals of a dual beam oscilloscope. This method is satisfactory but is objectionable because of the expense of a dual beam oscilloscope and the fact that it is a specialized piece of equipment often not conveniently available.

Another method of simultaneously displaying the input and output pulse waves of a repeater is to pass the waves thru a time-sharing switch to a single beam oscilloscope. The time-sharing switch operates at a sufficiently high speed so that the two pulse waves are simultaneously visible on the face of the cathode ray tube. This method is objectionable because of the cost of the required time-sharing switch. The simplest method of simultaneously observing the two pulse waves is to combine them in a resistive network and to apply the combined signal to the vertical deflection plates of a standard single beam oscilloscope. However, the combined waveform displayed is then of such a nature that it is difficult to readily distinguish that portion of the combined wave which is due to the input wave from that portion of the combined wave which is due to the output wave.

It is an object of this invention to simultaneously display two pulse waves on the face of an oscilloscope by simple means, wherein the characteristics of the two pulse waves are clearly distinguishable.

It is another object of this invention to display a first pulse wave with a distinctive indication superimposed thereon of the characteristics of the second pulse wave.

It is a further object of this invention to provide inexpensive and efficient means for simultaneously displaying a degraded telegraph signal and a regenerated telegraph signal derived therefrom.

In one aspect, the invention comprises a pulse modification circuit to which a first pulse wave is applied, and from which a second pulse wave is derived. A small portion of the first pulse wave is passed thru a resistor, and a small portion of the second pulse wave is passed thru a capacitor and also thru the same resistor. The potential developed across the resistor is applied to one set, for example, the vertical deflection plates of a cathode ray oscilloscope. The output of a sweep generator in the oscilloscope is applied to the other set, for example, the horizontal deflection plates of the cathode ray tube. The first pulse wave appears unchanged on the face of the cathode ray tube. The second pulse wave in going thru the capacitor and the resistor, is differentiated so that the resulting voltage spikes developed by the leading and trailing edges of the second pulse wave are superimposed on the first pulse wave. The composite voltage wave appears on the face of the cathode ray tube. That portion of the display due to the first pulse wave is clearly distinguishable from the spikes which represent the second pulse wave.

These and other objects and aspects of the invention will be apparent to those skilled in the art from the following detailed description taken in conjunction with the appended drawing, wherein:

Fig. 1 is a circuit diagram of a pulse comparison display system according to this invention;

Fig. 2 is a circuit diagram of a modification whereby alternative connections are provided for an oscilloscope; and Fig. 3 is a chart of waveforms which will be referred to in explaining the operation of the invention.

Fig. 1 shows a pulse comparison display system wherein the input and output pulse waves of a pulse modification circuit are simultaneously displayed on a cathode ray tube. Pulse modification circuit 8 has input terminals 9 and 10 output terminals 11 and 12. Terminals 10 and 12 are connected to ground. The input signal to input terminal 9 may be as shown by waveform $a$ of Fig. 3. The pulse modification circuit 8 may be such as to translate the input signal to an output signal on output terminal 11 as shown by waveform $b$ of Fig. 3.

The signal applied to input terminal 9 is also applied thru a current reducing resistor R1 and a common resistor R in series to ground. The output signal from output terminal 11 is applied to a utilization device (not shown) and is also applied thru a current reducing resistor R2, a capacitor C and the common resistor R, all in series to ground. The terminals of common resistor R are connected respectively to the vertical deflection plates 15, 15 of a cathode ray tube. A sweep generator or a sawtooth wave generator 17 has output terminals connected respectively to the horizontal deflection plates 19, 19 of cathode ray tube 16. The cathode ray tube 16 and the sweep generator 17 are included, along with other circuit components, in a conventional cathode ray tube oscilloscope. The input signal to the pulse modification circuit 8 may be a telegraph signal badly degraded in passing over a communication link from a distant point. The pulse modification circuit 8 may be a regenerative repeater which reconstructs the original telegraph signal. In the regenerative process, the output signal from the pulse modification circuit 8 is necessarily somewhat delayed in time.

In the operation of the circuit of Fig. 1, a small part of the input signal current to input terminal 9 is allowed to flow thru current-reducing resistor R1 and the common resistor R. The voltage waveform appearing across common resistor R is exactly proportional to the input voltage waveform applied to input terminal 9. A part of the output signal current from output terminal 11 is applied thru current-reducing resistor R2, capacitor C and the common resistor R. Capacitor C and common resistor R constitute a differentiating circuit. The values of capacitor C and resistor R in the differentiating circuit are selected so that a rapid voltage transition applied to the circuit appears entirely across the resistor R. This is due to the fact that it takes time to change the voltage across a capacitor. The leading edge of an output pulse wave applied to the differentiator circuit therefore causes a voltage spike to appear across the resistor R. The voltage spike has an exponential trailing edge caused by the charging up of capacitor C. The voltage spike due to the output signal is superimposed upon the pulse wave due to the input signal in the common resistor R. The composite voltage wave across common resistor R, in the example given, is then as shown by waveform $d$ of Fig. 3. This waveform is applied to the vertical deflection plates 15, 15 of the cathode ray tube 16 to provide a display on the face of the cathode ray tube which is exactly the same as that shown by waveform $d$ of Fig. 3.

If the capacitor C were omitted from the circuit, the display on the face of the cathode ray tube 16 would be as shown by waveform $c$ of Fig. 3. It will be noted that this waveform is the arithmetic sum of the input and output waveforms $a$ and $b$. It is apparent that waveform $c$ is difficult to interpret in that it does not clearly show which portion of the waveform is due to the input pulse wave and which portion of the waveform is due to the output pulse wave. However, by following the teachings of this invention, the resulting display as shown by the waveform $d$ is very easily interpreted. The input pulse wave is reproduced and the leading and trailing edges of the output waveform are marked by voltage spikes superimposed upon the input pulse waveform.

This form of display is especially useful for observing the input and output of a regenerative telegraph repeater because the degenerated input pulse wave is presented in its degenerated form and the regenerated output waveform is shown by spikes indicating the leading and trailing edges of the reformed pulse wave. Stated another way, the output waveform is known to be a clean rectangular wave so that the display need only indicate the occurrence of the leading and trailing edges of the pulses. On the other hand, the actual shape of the degenerated input pulse wave is unknown and it is therefore desirable that it be shown or displayed substantially in its entirety. A glance at the waveform $d$ of Fig. 3 is sufficient to impart to the observer the exact shape of the input pulse wave, the duration of the pulses in the output pulse wave, and the phase relationship between the two pulse waves.

If the output pulse wave were reversed in polarity from that shown in waveform $b$ of Fig. 3, the display on the face of the cathode ray tube 16 would be as shown by waveform $e$. It will be noted in waveform $e$ that the voltage spikes due to the output pulse wave have a polarity opposite from the pulses of the input pulse wave. It is apparent that the nature of the display is such that the polarity of an output pulse is clearly shown as well as the time at which its leading and trailing edges occur.

Fig. 2 shows a modified pulse comparison display system whereby either the input pulse wave or the output pulse wave may be displayed in its entirety, and the other pulse wave may be represented by spikes occurring at the leading and trailing edges of the pulse wave. When the vertical deflection plates of a cathode ray oscilloscope are connected to the terminals 20, the operation of the circuit, and the nature of the display, are the same as has been described in connection with the circuit of Fig. 1. Resistor R′ is the common resistor across which the composite voltage waveform is created.

When the vertical deflection plates of the cathode ray oscilloscope are connected to the terminals 21, the output waveform on output terminals 11′, 12′ is faithfully reproduced across common resistor R″ and on the face of the oscilloscope. The input waveform on input terminals 9′, 10′ is passed thru the current reducing resistor R1′ to the differentiator circuit including C′ and R″. The composite waveform across common resistor R″ and on the face of the oscilloscope includes spikes representative of the leading and trailing edges of the input pulse wave. Therefore, by the construction of Fig. 2, the oscilloscope may be connected to display the input waveform in its entirety and the output waveform in the form of superimposed spikes, or, the oscilloscope may be connected to display the output waveform in its entirety and the input waveform in the form of superimposed spikes.

It is apparent that this invention provides a very simple and inexpensive means by which two waveforms may be combined into a composite waveform which may be displayed and observed without any confusion as to the portions of the composite wave which are due to the respective individual waveforms.

What is claimed is:

1. A pulse comparison display system comprising, a first pulse source and a second pulse source, a common resistor, means to apply waves from said first pulse source to said resistor, a capacitor, means to apply waves from said second pulse source thru said capacitor to said resistor, said capacitor and said resistor constituting a differentiating circuit, a cathode ray oscilloscope, and means to apply the voltage developed across said common resistor to the input terminals of said oscilloscope.

2. A pulse comparison display system comprising a source of a first pulse wave, a source of a second pulse wave representing a delayed and regenerated replica of said first pulse wave, a common resistor, a capacitor connected in series with said resistor to form a differentiating circuit, means to apply said first pulse wave to said resistor, means to apply to said second pulse wave thru said capacitor to said resistor to cause said second pulse wave to appear at said resistor as voltage spikes superimposed upon said first pulse wave and corresponding to the leading and trailing edges of said second pulse wave, and means to display the composite voltage waveform appearing across said resistor.

3. In combination, a pulse modification circuit having input and output terminals, means to apply a pulse wave to said input terminals, a common resistor, means to also apply said pulse wave to said common resistor, a capacitor connected in series with said common resistor to form with said common resistor a differentiator circuit, and means coupling the output terminals of said pulse modification circuit thru said capacitor to said common resistor, whereby the potential developed across said common resistor may be applied to the input terminals of an oscilloscope.

4. The combination as defined in claim 3 and wherein said oscilloscope is a cathode ray oscilloscope, said combination including means to apply the potential developed across said common resistor to the vertical deflection means of said oscilloscope.

5. The combination as defined in claim 3 wherein said means to apply said pulse wave to said common resistor includes a current reducing resistor, and wherein said means coupling the output terminals of said pulse modification circuit thru said capacitor to said common resistor includes a second current reducing resistor.

6. A waveform comparing circuit comprising, a source of a first voltage waveform, a source of a second voltage waveform, a common resistor, means including a current reducing resistor for applying a portion of said first waveform thru said common resistor, a capacitor, means including a second current reducing resistor for applying a portion of said second waveform thru said capacitor and thru said common resistor, said capacitor and said common resistor constituting a differentiating circuit and means to display the composite voltage waveform appearing across said common resistor.

7. A pulse comparison display system comprising; a pulse modification circuit, and input and output circuits therefor; first and second common resistors; a capacitor; means to apply an input signal waveform to said input circuit thru said first common resistor, and also thru said capacitor and said second common resistor in series; means to apply the output signal waveform from said output circuit thru said second common resistor, and also thru said capacitor and said first common resistor in series; and means to display the voltage waveforms appearing across said first and second common resistors.

8. In a pulse comparison display system, a waveform combining circuit comprising a resistor, means to apply a first voltage waveform across said resistor, a capacitor connected in series with said resistor to form a differentiating circuit, means to apply a second voltage waveform thru said capacitor to said resistor to cause said second waveform to appear at said resistor as voltage spikes superimposed upon said first waveform and corresponding to the leading and trailing edges of said second waveform, an oscilloscope, and means to apply the composite waveform appearing across said resistor to said oscilloscope to provide a display of said composite waveform.

9. In a pulse comparison display system, a waveform combining circuit comprising, a resistor, means to apply a first voltage waveform across said resistor, a capacitor, means to apply a second waveform across said capacitor and said resistor in series, said capacitor and said resistor constituting a differentiating circuit, a cathode ray oscilloscope having a pair of input terminals, and means for connecting one of said terminals to one end of said resistor and the other of said terminals to the other end of said resistor, whereby the voltage developed across said resistor is applied to said input terminals.

10. In a pulse comparison display system, a waveform combining circuit as claimed in claim 9 and wherein said input terminals are connected to the vertical deflection plates of said oscilloscope.

References Cited in the file of this patent

UNITED STATES PATENTS

| 2,300,189 | Wolff | Oct. 27, 1942 |
| 2,373,145 | Sensiper | Apr. 10, 1945 |
| 2,449,169 | Kirkwood et al. | Sept. 14, 1948 |
| 2,462,095 | Halpert et al. | Feb. 22, 1949 |
| 2,503,060 | Miller | Apr. 4, 1950 |
| 2,570,139 | Maxwell | Oct. 2, 1951 |
| 2,617,932 | Coughlin | Nov. 11, 1952 |
| 2,700,741 | Brown | Jan. 25, 1955 |
| 2,713,651 | Coffey | July 19, 1955 |